(12) United States Patent
Simms (10) Patent No.: US 11,967,917 B2
(45) Date of Patent: Apr. 23, 2024

(54) METHODS OF BRAKING MOTORS AND MOTOR STARTERS EMPLOYING THE SAME

(71) Applicant: Eaton Intelligent Power Limited, Dublin (IE)

(72) Inventor: Stan Rex Simms, Arden, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/652,227

(22) Filed: Feb. 23, 2022

(65) Prior Publication Data
US 2023/0268851 A1 Aug. 24, 2023

(51) Int. Cl.
*H02P 3/20* (2006.01)

(52) U.S. Cl.
CPC ........................................ *H02P 3/20* (2013.01)

(58) Field of Classification Search
CPC ...... H02P 3/00; H02P 6/24; H02P 8/24; H02P 9/08
See application file for complete search history.

(56) References Cited

U.S. PATENT DOCUMENTS

| | | | |
|---|---|---|---|
| 4,833,386 A | 5/1989 | Unsworth | |
| 4,978,897 A | 12/1990 | Merrison et al. | |
| 5,003,241 A | 3/1991 | Rowan et al. | |
| 5,151,241 A | 9/1992 | Maier et al. | |
| 5,187,419 A * | 2/1993 | DeLange | H02P 3/18 318/400.2 |
| 7,345,449 B2 | 3/2008 | Barie et al. | |
| 8,138,709 B2 | 3/2012 | Messersmith et al. | |
| 8,179,082 B2 | 5/2012 | Li et al. | |
| 9,350,275 B2 | 5/2016 | Wei et al. | |
| 9,685,898 B2 | 6/2017 | Wei et al. | |
| 2010/0207554 A1 * | 8/2010 | Hertz | H02P 3/20 318/373 |
| 2018/0062544 A1 | 3/2018 | Vaneyll et al. | |

OTHER PUBLICATIONS

PF Controllers, The Intelligent Controller with Extensive Starting and Stopping Configurtions up to 1000HP (3-wire), 1400HP 96-wire); www.sprecherschuh.com/ecatalog; (2018); 27 Pages.
Bernhardt, Bill; CT430—Soft Starters on Motor Applications; Rockwell Automation; May 16, 2018; pp. 1-56.
Bernhardt, et al.; Slow Speed Applications Using a Soft Starter; Rockwell Automation; Publication 150-WP009A-EN-P Oct. 2016; pp. 1-8.

* cited by examiner

Primary Examiner — Said Bouziane
(74) Attorney, Agent, or Firm — Stanek Lemon Crouse & Meeks, PA (57) ABSTRACT

Pairs of phases of an AC power source are connected to pairs of phases of a motor in a first sequence that repeats at a first frequency. The motor is braked by connecting pairs of phases of the AC power source to pairs of phases of the motor in a second sequence that is reversed with respect to the first sequence and that repeats at a second frequency less than the first frequency. In further aspects, pairs of phases of an AC power source are connected to pairs of phases of a motor in a first sequence. The motor is subsequently disconnected from the AC power source for a predetermined dwell interval having a duration greater than a time constant of the motor. The motor is braked using a second sequence that is reversed with respect to the first sequence.

28 Claims, 6 Drawing Sheets

METHODS OF BRAKING MOTORS AND MOTOR STARTERS EMPLOYING THE SAME

BACKGROUND

Motor starters are commonly used with industrial electric motors. Typical solid-state motor starters control starting characteristics to meet application requirements, including acceleration and deceleration time, starting current and motor torque. Soft starters are commonly used to limit inrush current when the motor is first coupled to a power source, as large inrush currents may cause voltage dips that may negatively affect other loads coupled to the same source. Starters may also limit starting torque, as high starting torque may cause electromechanical shock that can damage windings and other components of the motor, as well as drive trains and other components mechanically coupled to the motor.

A reduced-voltage soft starter (RVSS) may use silicon-controlled rectifiers (SCRs) that are connected in series between an AC power source and the load. The SCRs may be phase controlled to apply a reduced RMS voltage to the motor during startup. Typically, the RMS voltage is ramped up to the normal operating RMS voltage at a preset rate by firing the SCRs at varying alpha delay phase angles in successive cycles at the fundamental frequency of the AC power source.

A frequent problem faced by motor controllers is stopping. When sufficient load is present, resistance provided by the load may be sufficient to stop a motor within an acceptable amount of time. Stopping can be problematic, however, when a motor is relatively lightly loaded, as a lightly loaded motor may act like a flywheel and take several minutes for a de-energized motor to spin down due to inertia of the motor's rotor.

Various motor braking techniques have been developed. DC braking involves applying a DC supply to the stator of an induction motor. DC current flowing through the stator produces a stationary magnetic field, with motion of the rotor in this field inducing a voltage in the rotor winding and causing energy to be dissipated in the rotor circuit resistance, thus providing braking. Some starters employ a braking technique wherein the polarity of the supply line voltage and the voltage induced by back electromotive force (emf) in the motor are monitored and, when these polarities are opposite to each other, the supply line current is applied to the motor until the next zero current crossing occurs, thus providing a negative torque pulse that slows the motor. Other braking techniques include using a reversing contactor that swaps two of the motor phases to reverse the phase sequence applied by the starter, thus generating a negative torque that slows the motor.

SUMMARY

Some embodiments provide methods including connecting pairs of phases of an AC power source to pairs of phases of a motor in a first sequence that repeats at a first frequency and braking the motor by connecting pairs of phases of the AC power source to pairs of phases of the motor in a second sequence that is reversed with respect to the first sequence and that repeats at a second frequency less than the first frequency. The first frequency may be a fundamental line frequency of the AC power source and the second frequency may be one fifth or less of the fundamental line frequency of the AC power source.

In some embodiments, connecting pairs of phases of an AC power source to pairs of phases of the motor in the first sequence may be followed by and braking the motor by connecting pairs of phases of the AC power source to pairs of phases of the motor in a second sequence may be preceded by blocking current conduction between the AC power source and the motor for a predetermined dwell interval. The dwell interval may be greater than a time constant of the motor. In some embodiments, the dwell interval may be from about 8 seconds to about 12 seconds.

In some embodiments, connecting pairs of phases of an AC power source to pairs of phases of the motor in the first sequence may include turning on pairs of switches that connect pairs of phases of the AC power source to pairs of phases of the motor to provide the first sequence and connecting pairs of phases of the AC power source to pairs of phases of the motor in a second sequence may include turning on pairs of the switches to provide the second sequence. In further embodiments, turning on pairs of the switches to provide the second sequence may include incrementally increasing conduction intervals of the switches. Incrementally increasing conduction intervals of the switches may include increasing the conduction intervals until a current provided to the motor reaches a predetermined limit. The methods may further include limiting the conduction intervals responsive to the current reaching the predetermined limit.

According to further aspects, braking the motor by connecting pairs of phases of the AC power source to pairs of phases of the motor in a second sequence may be followed by blocking current conduction between the AC power source and the motor responsive to a speed of the motor meeting a predetermined criterion. The methods may further include detecting a current of the motor and blocking current conduction between the AC power source and the motor responsive to a speed of the motor meeting a predetermined criterion may include blocking current conduction between the AC power source and the motor responsive to the detected current.

Still further embodiments provide methods including connecting pairs of phases of an AC power source to pairs of phases of a motor in a first sequence, disconnecting all of the phases of the motor from the AC power source for a predetermined dwell interval having a duration greater than a time constant of the motor, and braking the motor by connecting pairs of phases of the AC power source to pairs of phases of the motor in a second sequence that is reversed with respect to the first sequence. The dwell interval may be greater than a time constant of the motor. In some embodiments, the dwell interval may be from about 8 seconds to about 12 seconds.

In some embodiments, braking the motor by connecting pairs of phases of the AC power source to pairs of phases of the motor in a second sequence that is reversed with respect to the first sequence may include incrementally increasing the intervals during which pairs of phases of the AC power source are connected to pairs of phases of the motor until a current provided to the motor reaches a predetermined limit. The method further may further include limiting the intervals responsive to the current reaching the predetermined limit. The second sequence may be reversed with respect to the first sequence. Braking the motor by connecting pairs of phases of the AC power source to pairs of phases of the motor in a second sequence may be followed by blocking current conduction between the AC power source and the motor responsive to a speed of the motor meeting a predetermined criterion. The methods may further include detecting a current of the motor and blocking current conduction between the AC power source and the motor responsive to a speed of the motor meeting a predetermined criterion may include blocking current conduction between the AC power source and the motor responsive to the detected current.

Further embodiments provide a motor starter including a plurality of switches configured to selectively connect phases of an AC power source to phases of motor and a control circuit configured to operate the plurality of switches to connect pairs of phases of an AC power source to pairs of phases of the motor in a first sequence that repeats at a first frequency to thereby drive the motor and to operate the plurality of switches to connect pairs of phases of the AC power source to pairs of phases of the motor in a second sequence that is reversed with respect to the first sequence and that repeats at a second frequency less than the first frequency to thereby brake the motor.

Still further embodiments provide a motor starter including a plurality of switches configured to selectively connect phases of an AC power source to phases of motor and a control circuit configured to operate the plurality of switches to connect pairs of phases of an AC power source to pairs of phases of the motor in a first sequence to thereby drive the motor, to operate the plurality of switches to disconnect all of the phases of the motor from the AC power source for a predetermined dwell interval having a duration greater than a time constant of the motor after terminating the first sequence, and to operate the plurality of switches to connecting pair of phases of the AC power source to pairs of phases of the motor in a second sequence that is reversed with respect to the first sequence to thereby brake the motor after the dwell interval.

DETAILED DESCRIPTION

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments herein with reference to block diagrams and/or flowchart illustrations. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM) Program instructions and data stored on a tangible computer-accessible storage medium in non-transitory form may further be transmitted by transmission media or signals such as electrical, electromagnetic, or digital signals, which may be conveyed via a communication medium such as a network and/or wireless link.

Some embodiments of the inventive concept arise from a realization that improved braking of lightly-loaded motors may be achieved by applying a reverse phase sequence to the motor after a predetermined dwell time has passed sufficient time for demagnetization of remnant flux in the motor. The braking sequence may have a lower frequency than the forward sequence used to drive the motor, and the braking sequence may be terminated when motor current begins to rise, indicating that the motor is at or near zero speed.

Figure 1:
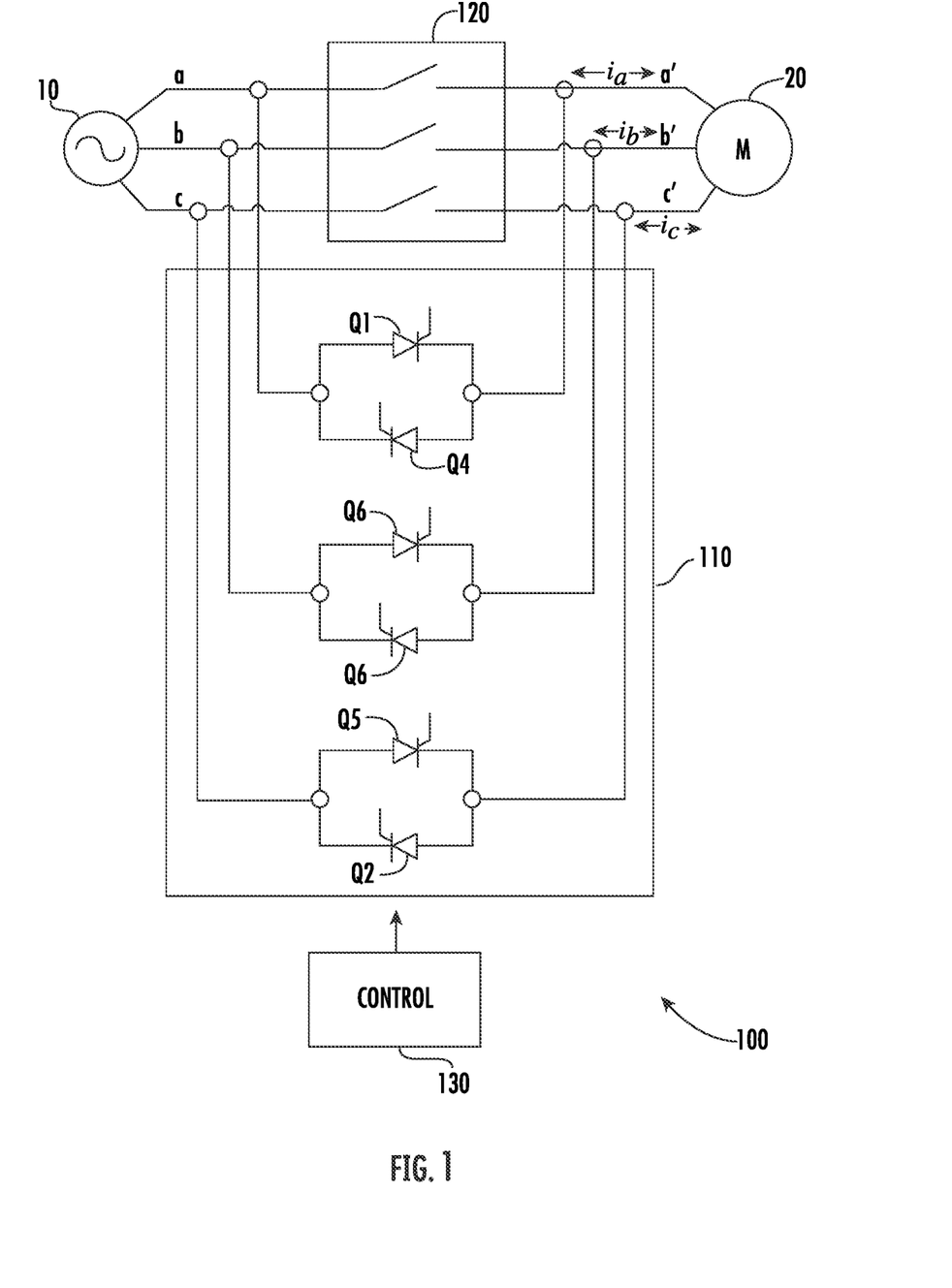
FIG. 1 illustrates a motor starter apparatus for implementation of various embodiments of the inventive subject matter.

FIG. 1 illustrates a motor starter apparatus 100 according to some embodiments. The apparatus includes a reduced voltage soft starter 110 including a plurality of pairs of anti-parallel connected SCRs Q1, Q2, Q3, Q4, Q5, Q6 configured to connect respective phases a, b, c of an AC power source 10 to respective phases a', b', c' of a motor 20. A bypass switch 120 may be configured to bypass the soft starter 110 and directly connect the motor 20 to the AC power source 10. A control circuit 130 is configured to control the soft starter 110 and the bypass switch 120. In particular, according to various embodiments, the control circuit 130 may be configured to operate the SCRs Q1, Q2, Q3, Q4, Q5, Q6 to drive and brake the motor as described below with reference to FIGS. 2-8. It will be appreciated that the control circuit 120 may generally include analog circuitry, digital circuitry and combinations thereof. For example, the control circuit 120 may include a microcontroller or other processor-based device and associated circuitry (e.g., memory, sensor and drive interface circuitry and the like) configured to perform motor control operations as described herein using software executing on the microcontroller.

Figure 2:
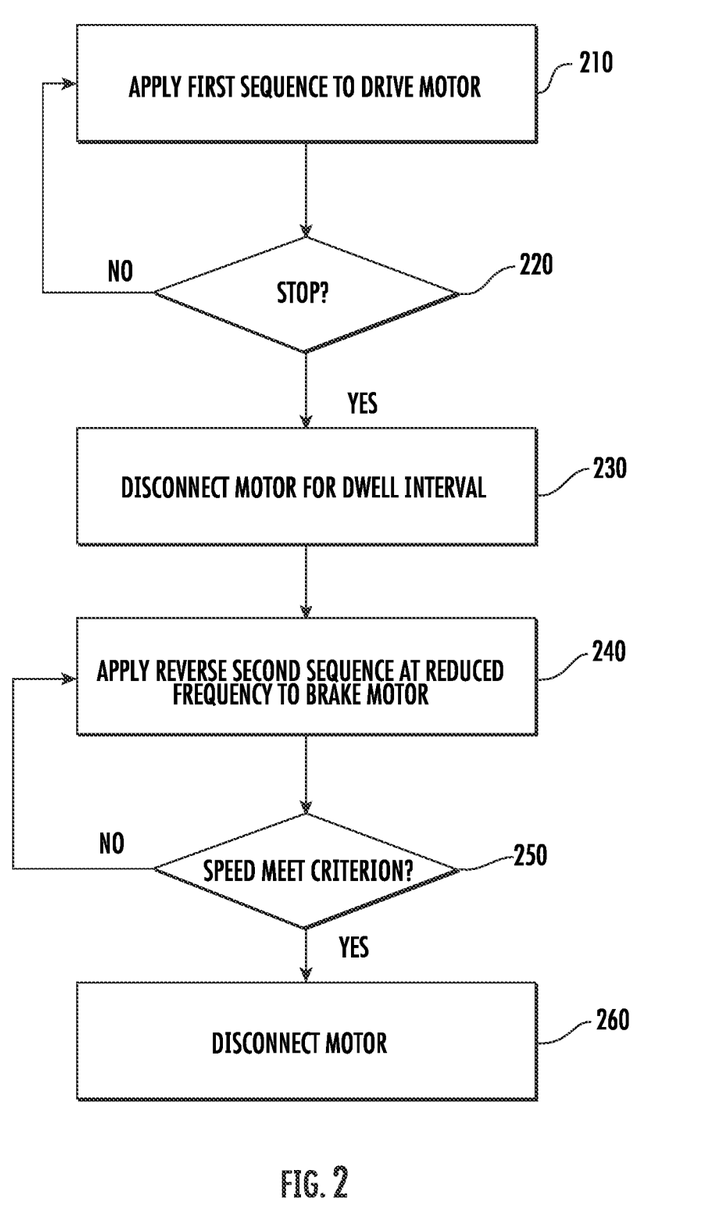
FIG. 2 is a flowchart illustrating operations for driving and braking a motor using an apparatus such as shown in FIG. 1 according to some embodiments.

Referring to FIG. 2, operations for controlling a motor using the apparatus of FIG. 1 according to some embodiments include applying a first phase sequence to the motor 20 to drive the motor 20 (block 210). The first sequence may, for example, be a "positive" (ABC) or a "negative" (ACB) sequence. These operations may include ramping an RMS voltage applied by the motor starter 110 to the motor 20 to accelerate the motor 20 up to a desired speed. This may involve sequentially connecting pairs of the phases a, b, c of the AC power source 10 to pairs of the phases a', b', c' of the motor 20 and using alpha (α) control wherein the SCRs Q1, Q2, Q3, Q4, Q5, Q6 are triggered at a phase angle α prior to zero crossings of the phase voltages of the AC source 10, with a being incrementally increased to accelerate the motor 20 to a desired speed. These operations may further include transitioning to a bypassed condition wherein the motor is directly driven by the AC source 10 by closing the bypass switch 120. The first phase sequence repeats at the fundamental line frequency (e.g., 50 or 60 Hz) of the AC source 10.

When it is desired to stop the motor, the motor is disconnected from the AC power source 10 for a predetermined dwell interval by, for example, opening the bypass switch 120 and keeping the SCRs Q1, Q2, Q3, Q4, Q5, Q6 in an "off" state (blocks 220, 230). In some embodiments, the dwell interval may have a duration of greater than a time constant of the motor 20 in order to provide sufficient time for demagnetization of remnant flux in the motor 20. After the dwell interval, the motor starter 110 applies a second phase sequence to the motor 20 to brake the motor 20 (block 240). The second phase sequence is reversed with respect to the first sequence and may repeat at a frequency that is less that the frequency of the first sequence. For example, if the first sequence is a positive (ABC) sequence, the second sequence may be a negative (ACB) sequence. The second sequence may have, for example, a frequency of ⅕ or less (e.g., 1/11) of the frequency of the first sequence. When a speed of the motor 20 meets a predetermined criterion (e.g., at or near zero speed), the motor 20 is again disconnected from the AC source 10 (block 260).

Figure 3:
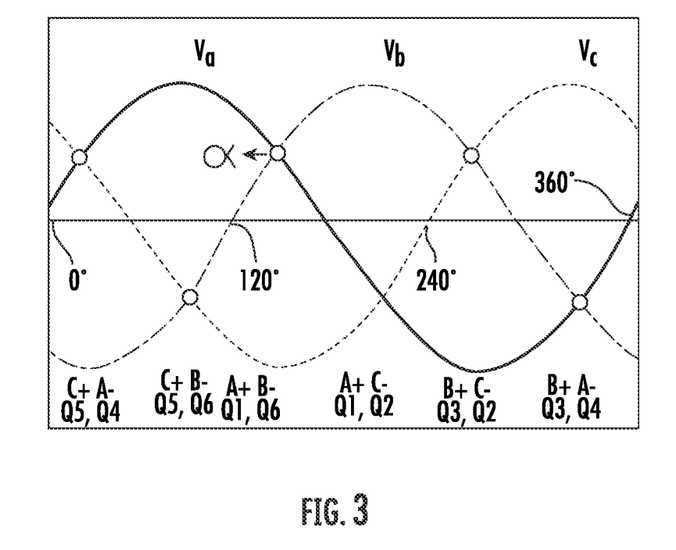
FIG. 3 illustrates an example of a first phase sequence for driving a motor that may be implemented by the apparatus of FIG. 1.
Figure 4:
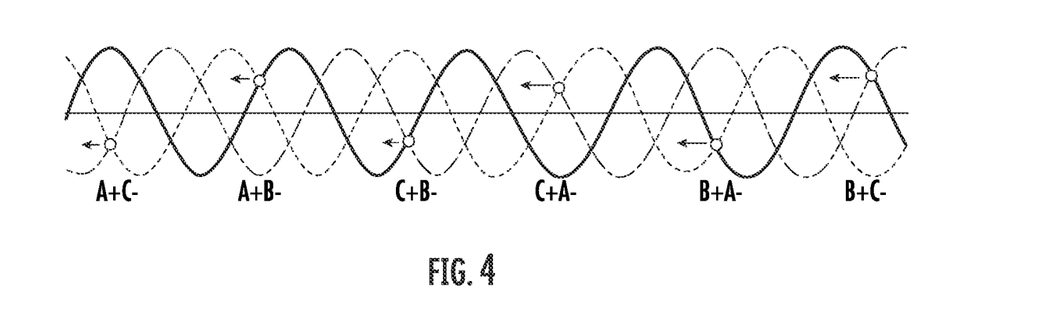
FIG. 4 illustrates an example of a second phase sequence that may be used by the apparatus of FIG. 1 to brake a motor according to some embodiments of the inventive subject matter.

FIGS. 3 and 4 illustrate examples of the first and second sequences of FIG. 2. Referring to FIG. 3, the first sequence may take the form of A−/C+(Q4, Q5 on), C+/B− (Q5, Q6 on), A+/B− (Q1, Q6 on), A+/C− (Q1, Q2 on), B+/C− (Q3, Q2 on), and B+/A− (Q3, Q4 on). This sequence repeats for each line cycle of the AC waveform. As shown in FIG. 4, phases B and C are swapped for the second sequence, producing a sequence of A+/C−, A+/B−, C+/B−, C+/A−, B+/A− and B+/C−. This sequence repeats once every 5 line cycles.

Figure 5:
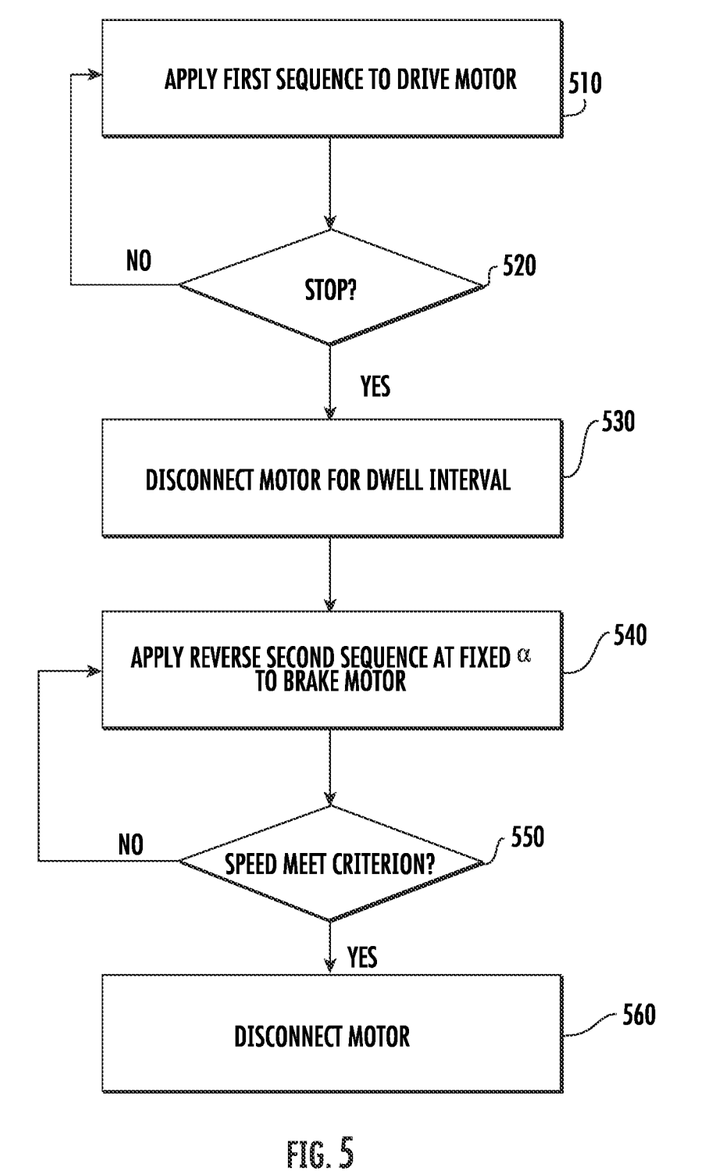
FIG. 5 is a flowchart illustrating operations for driving and braking a motor using an apparatus such as shown in FIG. 1 according to some embodiments of the inventive subject matter.

According to some embodiments, alpha phase delay phase may be fixed for a sequence used for braking as described above. Referring to FIG. 5, a first phase sequence is applied to the motor 20 to drive the motor 20 (block 510). These operations may include ramping an RMS voltage applied by the motor starter 110 to the motor 20 to accelerate the motor 20 up to a desired speed using a first phase sequence with alpha varying to accelerate the motor to a desired speed and, responsive to meeting a desired speed, transitioning to a bypassed condition wherein the motor is directly driven by the AC source 10 by closing the bypass switch 120. When it is desired to stop the motor, the motor is disconnected from the AC power source 10 for a predetermined dwell interval (blocks 520, 530). After the dwell interval, the motor starter 110 applies a second phase sequence to the motor 20 at a fixed a to brake the motor 20 (block 540). When a speed of the motor 20 meets a predetermined criterion (e.g., at or near zero speed), the motor 20 is again disconnected from the AC source 10 (block 560).

Figure 6:
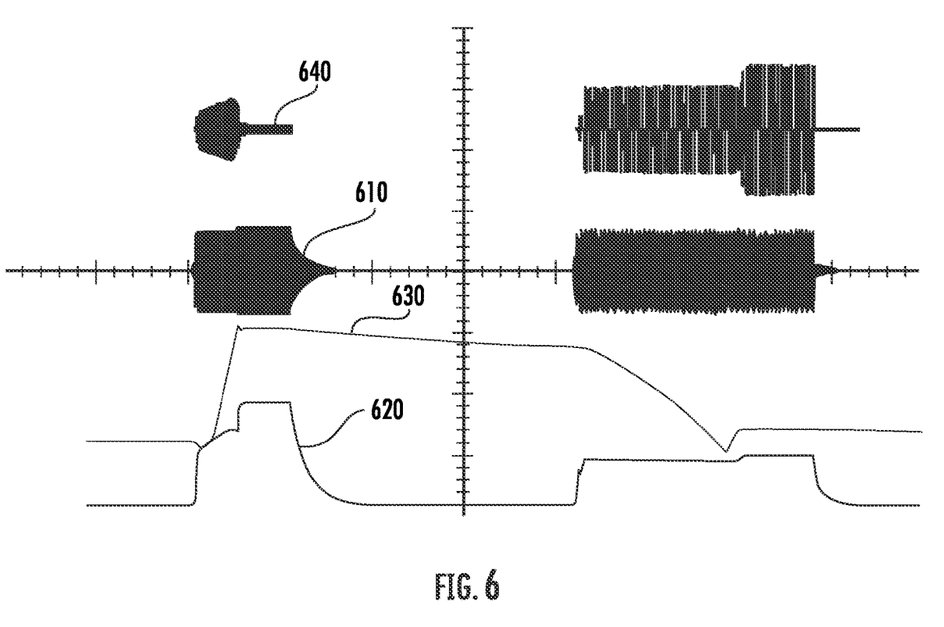
FIG. 6 illustrates performance of a motor controlled according to operations outlined in FIG. 5.

FIG. 6 illustrates phase voltage 610, RMS voltage 620, speed 630 and current 640 of a motor controlled in the manner described with reference to FIG. 5. Initially, the motor speed is ramped up by applying a ramped RMS voltage to the motor, after which the motor starter transitions to a bypass mode. The motor starter then disconnects the motor from the AC source for a dwell interval wherein the motor starts to reduce its speed at a relatively slow rate. After the dwell interval ends, the motor starter applies a reduced-frequency reversed phase sequence to the motor, causing it to decelerate more rapidly. When the motor speed 630 approaches zero, the motor starter may again disconnect the motor from the AC source.

As shown in FIG. 6, when the motor speed reaches zero, the current 640 may begin to increase again. This increase in current may be used to signal the end of the braking period, and the motor starter may disconnect the motor responsive to detecting this current increase to prevent the motor from reversing. Accordingly, referring to FIGS. 1 and 5, determining whether the speed of the motor meets a predetermined criterion (block 550) may include detecting whether the motor current (e.g., currents $i_a$, $i_b$, $i_c$ in FIG. 1) meets a predetermined criterion (e.g., begins to increase).

Figure 7:
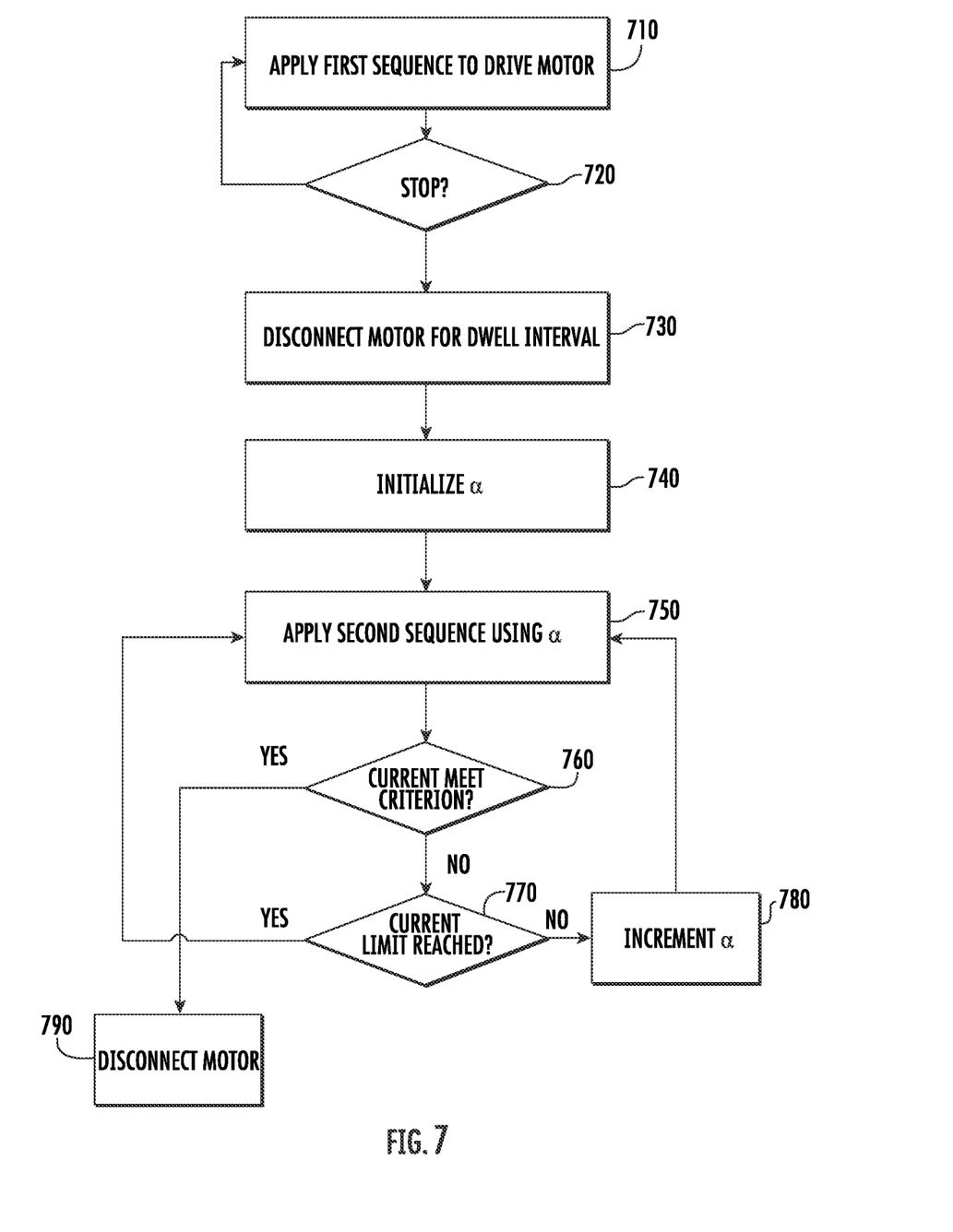
FIG. 7 is a flowchart illustrating operations for driving and braking a motor using an apparatus such as shown in FIG. 1 according to further embodiments of the inventive subject matter.

According to further embodiments, braking may involve using an incrementally increasing alpha control scheme. Referring to FIG. 7, the motor starter 110 applies a first phase sequence to the motor 20 to drive the motor 20 (block 710). These operations may include ramping an RMS voltage applied by the motor starter 110 to the motor 20 to accelerate the motor 20 up to a desired speed using a first phase sequence with alpha control and transitioning to a bypassed condition wherein the motor is directly driven by the AC source 10 by closing the bypass switch 120. When it is desired to stop the motor, the motor is disconnected from the AC power source 10 for a predetermined dwell interval (blocks 720, 730). After the dwell interval, the motor starter 110 applies a second phase sequence to the motor 20 at an initial value of α to begin braking the motor 20 (blocks 740, 750). If a current of the motor 20 does not meet a predetermined criterion corresponding to a desired speed (e.g., at or near zero) and a current limit has not been reached, a may be incremented such that the motor starter 110 drives the motor using the increased α (blocks 760, 770, 780). If the current limit is reached, α is kept at a constant value to continue driving the motor 20. When the current of the motor 20 meets a predetermined criterion (e.g., at or near zero speed), the motor 20 is again disconnected from the AC source 10 (block 790).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method comprising:
connecting pairs of phases of an AC power source to pairs of phases of a motor in a first sequence that repeats at a first frequency, wherein connecting pairs of phases of an AC power source to pairs of phases of the motor in the first sequence comprises turning on pairs of switches that connect pairs of phases of the AC power source to pairs of phases of the motor to provide the first sequence; and
braking the motor by connecting pairs of phases of the AC power source to pairs of phases of the motor in a second sequence that is reversed with respect to the first sequence and that repeats at a second frequency less than the first frequency, wherein connecting pairs of phases of the AC power source to pairs of phases of the motor in a second sequence comprises turning on pairs of the switches to provide the second sequence.

2. The method of claim 1, wherein the first frequency is a fundamental line frequency of the AC power source and wherein the second frequency is one fifth or less of the fundamental line frequency of the AC power source.

3. The method of claim 1, wherein connecting pairs of phases of an AC power source to pairs of phases of the motor in the first sequence is followed by and braking the motor by connecting pairs of phases of the AC power source to pairs of phases of the motor in a second sequence is preceded by blocking current conduction between the AC power source and the motor for a predetermined dwell interval.

4. The method of claim 3, wherein the dwell interval is greater than a time constant of the motor.

5. The method of claim 3, wherein the dwell interval is from about 8 seconds to about 12 seconds.

6. The method of claim 1, wherein turning on pairs of the switches to provide the second sequence comprises incrementally increasing conduction intervals of the switches.

7. The method of claim 6, wherein incrementally increasing conduction intervals of the switches comprises increasing the conduction intervals until a current provided to the motor reaches a predetermined limit and wherein the method further comprises limiting the conduction intervals responsive to the current reaching the predetermined limit.

8. The method of claim 1, wherein braking the motor by connecting pairs of phases of the AC power source to pairs of phases of the motor in a second sequence is followed by blocking current conduction between the AC power source and the motor responsive to a speed of the motor meeting a predetermined criterion.

9. The method of claim 8, further comprising detecting a current of the motor and wherein blocking current conduction between the AC power source and the motor responsive to a speed of the motor meeting a predetermined criterion comprises blocking current conduction between the AC power source and the motor responsive to the detected current.

10. A motor starter configured to perform the method of claim 1.

11. A method comprising:
connecting pairs of phases of an AC power source to pairs of phases of a motor in a first sequence;
disconnecting all of the phases of the motor from the AC power source for a predetermined dwell interval having a duration greater than a time constant of the motor; and
braking the motor by connecting pairs of phases of the AC power source to pairs of phases of the motor in a second sequence that is reversed with respect to the first sequence, and blocking current conduction between the AC power source and the motor responsive to a speed of the motor meeting a predetermined criterion.

12. The method of claim 11, wherein the dwell interval is from about 8 seconds to about 12 seconds.

13. The method of claim 11, wherein braking the motor by connecting pairs of phases of the AC power source to pairs of phases of the motor in a second sequence that is reversed with respect to the first sequence comprises incrementally increasing the intervals during which pairs of phases of the AC power source are connected to pairs of phases of the motor until a current provided to the motor reaches a predetermined limit and wherein the method further comprises limiting the intervals responsive to the current reaching the predetermined limit.

14. The method of claim 11, wherein the second sequence is reversed with respect to the first sequence.

15. The method of claim 11, further comprising detecting a current of the motor and wherein blocking current conduction between the AC power source and the motor responsive to a speed of the motor meeting a predetermined criterion comprises blocking current conduction between the AC power source and the motor responsive to the detected current.

16. A motor starter configured to perform the method of claim 11.

17. A motor starter comprising:
a plurality of switches configured to selectively connect phases of an AC power source to phases of motor; and
a control circuit configured to operate the plurality of switches to connect pairs of phases of an AC power source to pairs of phases of the motor in a first sequence that repeats at a first frequency to thereby drive the motor and to operate the plurality of switches to connect pairs of phases of the AC power source to pairs of phases of the motor in a second sequence that is reversed with respect to the first sequence and that repeats at a second frequency less than the first frequency to thereby brake the motor, wherein the control circuit is configured to cause the plurality of switches to disconnect all of the phases of the motor from the AC power source for a predetermined dwell interval before initiating the second sequence.

18. The motor starter of claim 17, wherein the first frequency is a fundamental line frequency of the AC power source and wherein the second frequency is one fifth or less of the fundamental line frequency of the AC power source.

19. The motor starter of claim 17, wherein the dwell interval is greater than a time constant of the motor.

20. The motor starter of claim 17, wherein the control circuit is configured to incrementally increase conduction intervals of the switches when producing the second sequence.

21. The motor starter of claim 20, wherein the control circuit is configured to incrementally increase the conduction intervals when producing the second sequence until a current provided to the motor reaches a predetermined limit and to then limit the conduction intervals responsive to the current reaching the predetermined limit.

22. The motor starter of claim 17, wherein the control circuit is configured to operate the plurality of switches to disconnect all of the phases of the motor from the AC power source responsive to a speed of the motor meeting a predetermined criterion.

23. The motor starter of claim 22, wherein the control circuit is configured to detect a current of the motor and to operate the plurality of switches to disconnect all of the phases of the motor from the AC power source responsive to the detected current.

24. A motor starter comprising:
a plurality of switches configured to selectively connect phases of an AC power source to phases of motor; and
a control circuit configured to operate the plurality of switches to connect pairs of phases of an AC power source to pairs of phases of the motor in a first sequence to thereby drive the motor, to operate the plurality of switches to disconnect all of the phases of the motor from the AC power source for a predetermined dwell interval having a duration greater than a time constant of the motor after terminating the first sequence, and to operate the plurality of switches to connecting pair of phases of the AC power source to pairs of phases of the motor in a second sequence that is reversed with respect to the first sequence to thereby brake the motor after the dwell interval, wherein the control circuit is configured to incrementally increase conduction intervals of the plurality of switches in the second sequence until a current provided to the motor reaches a predetermined limit and to limit the conduction intervals responsive to the current reaching the predetermined limit.

25. The motor starter of claim 24, wherein the dwell interval is from about 8 seconds to about 12 seconds.

26. The motor starter of claim 24, wherein the second sequence is reversed with respect to the first sequence.

27. The motor starter of claim 24, wherein the control circuit is configured to terminate the second sequence responsive to a speed of the motor meeting a predetermined criterion.

28. The motor starter of claim 27, wherein the control circuit is configured to detect a current of the motor and to terminate the second sequence responsive to the detected current.

* * * * *